United States Patent [19]

Smirl

[11] 4,080,848

[45] Mar. 28, 1978

[54] AUTOMOTIVE TRANSMISSION

[75] Inventor: Richard L. Smirl, Arlington Heights, Ill.

[73] Assignee: Borg-Warner Corporation, Chicago, Ill.

[21] Appl. No.: 689,424

[22] Filed: May 24, 1976

Related U.S. Application Data

[63] Continuation of Ser. No. 484,389, Jul. 1, 1974, abandoned.

[51] Int. Cl.² ...................... F16H 57/10; F16H 37/08
[52] U.S. Cl. ......................................... 74/759; 74/695
[58] Field of Search ................ 74/758, 759, 762, 763, 74/701, 695

[56] References Cited

U.S. PATENT DOCUMENTS

| 2,620,685 | 12/1952 | Smirl | 74/759 X |
| 3,073,183 | 1/1963 | Kelley | 74/759 X |
| 3,446,094 | 5/1969 | Ohno et al. | 74/701 X |
| 3,482,469 | 12/1969 | Mori | 74/759 X |
| 3,802,294 | 4/1974 | Smirl | 74/759 |

Primary Examiner—Samuel Scott
Assistant Examiner—Lance W. Chandler
Attorney, Agent, or Firm—Robert L. Zieg

[57] ABSTRACT

An automotive transmission having a planetary gear set with friction clutches and brakes controlling the gear sets to obtain four forward speed ratios and a single reverse speed ratio. The transmission includes an output gear mounted between the planetary gear set and the main input clutch to the gear set while another input clutch is provided on the other side of the planetary gear set from the output gear.

2 Claims, 1 Drawing Figure

U.S. Patent    March 28, 1978    4,080,848
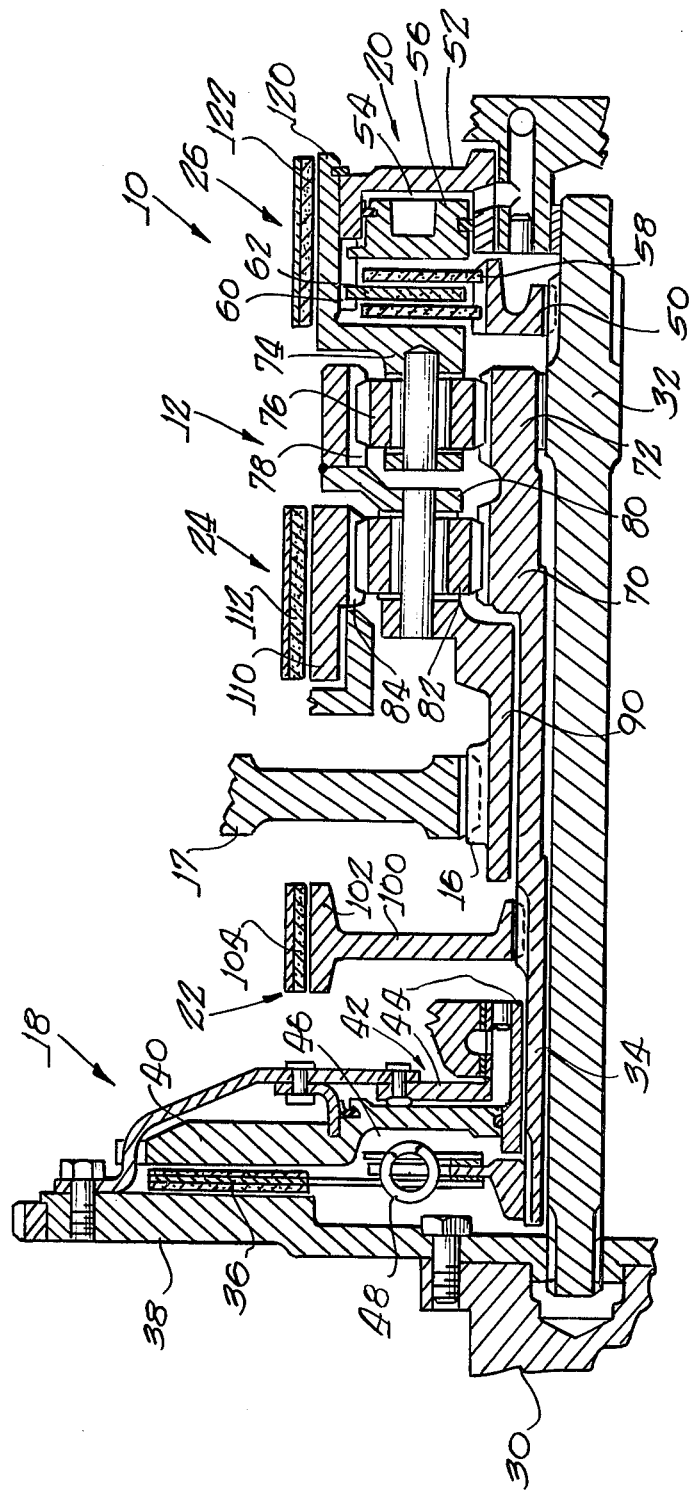

AUTOMOTIVE TRANSMISSION

This is a continuation, of application Ser. No. 484,389 filed July 1, 1974.

SUMMARY OF THE INVENTION

This invention relates to automotive transmissions and more particularly to such transmissions including planetary gear set combinations having suitable controls to provide a plurality of forward speed ratios and a reverse speed ratio.

Passenger automobiles, with small high-speed engines, have increased in sales popularity because of their low-cost and economical operation and mechanical maintenance. Various engine and drive arrangements have been proposed, including front engine with front wheel drive; an engine disposed longitudinal of the automobile with four-wheel drive; front engine with a dropped shaft, such as the de Dion drive; rear engine with front drive; and rear engine with rear drive. In these small engine-drive combinations, it is desirable to provide transmissions preferably of the type referred to as friction start transmissions, since it has been found by computer studies of the vehicle performance, that when sufficient gear ratio coverage has been provided to satisfy the performance requirements of small high speed engines, that the usefulness of the hydraulic torque converter is limited to very low vehicle speeds whereas its losses in small sizes result in a new loss of performance compared to a friction start clutch having a stall speed designed to maintain the traction limit throughout most of the first speed range.

In a preferred embodiment of the invention, a friction start type transmission capable of being readily adaptable for use in the different described engine-drive arrangements and having relatively simple gearing controllable to provide, in addition to reverse speed ratio, sufficient forward speed ratios for optimum performance. The present invention comprises an improvement on the transmission described in U.S. Pat. No. 3,802,294 of common assignee. In the mentioned patent, the input clutches 14 and 15 are mounted together on one side of the transmission. Many prior art transmissions, particularly of the planetary type having plural input clutches also use this general arrangement.

It has been found, particularly in a transmission of the friction start type as shown in the above-mentioned patent, that the size and space limitations of the combined plural input clutch structure make it difficult to properly cool the main input clutch. In addition the facing area of the main clutch is limited by such an arrangement. To obviate these problems, the present invention provides a unique arrangement for transmissions having a centrally located output element in that the plural input elements are at opposite ends of the transmission structure. The arrangement provides for the main input clutch at one end of the transmission with the output gear located between the main input clutch and the planetary gear set. The second input clutch is located on the opposite side of the planetary gear set from the output gear. By isolating the main input clutch in this way, many unique advantages are realized. As compared to a structure of the type shown in U.S. Pat. No. 3,802,294 the main clutch can have substantially larger friction face area allowing for increased torque capacity. In addition, the clutch has greater open space around it allowing for superior cooling characteristics and less restricted flow paths.

BRIEF DESCRIPTION OF THE DRAWINGS

The single view in the drawings is a longitudinal sectional view of an automotive transmission partially schematic embodying the principles herein described.

DETAILED DESCRIPTION

Referring to the drawing, the improved transmission is generally indicated at 10 and is shown in its application to a final transaxle drive arrangement.

The transmission 10, in its preferred form, comprises, generally, a planetary gear set 12, an output gear 16, fluid pressure-operated friction clutch assemblies 18 and 20, and three fluid pressure-operated friction brake assemblies 22, 24, and 26. The transmission 10 further includes an input shaft 30, an intermediate shaft 32, and an intermediate hollow shaft 34. Output gear 16 meshes with a gear 17 which may be, for example, the ring gear of a differential for an automotive vehicle.

The clutch 18, which is the main input clutch to the gear set 12, includes a friction plate 36 which is adapted to be pressed into engagement with a fly wheel 38 by a pressure plate 40. A hydraulic servo-motor 42 is provided mounted in a housing 44 and includes a cylinder 46 and piston 48. The piston 48 is connected to or may be formed integral with pressure plate 40 so that when fluid pressure is introduced into the cylinder 46 piston 48 will be moved to move pressure plate 40 toward fly wheel 38, to provide a driving connection between fly wheel 38 and the friction plate 36. Friction plate 36 is drivingly connected to the intermediate shaft 34. Of course, the fly wheel 38 is drivingly connected to the input shaft 30 which will be driven by the engine of the vehicle.

Shaft 32, as described above, is also connected to be driven by input shaft 30 and is connected to an input element 50 of clutch 20. Clutch 20 is the secondary clutch for transmission 10 and is adapted when engaged to drivingly connect shaft 32 to an input element of the planetary gear set 12. Clutch 20 is thus in a parallel arrangement with clutch 18 to act as a second input to the gear set 12.

Clutch 20 includes a housing 52 having a cylinder 54 therein. A piston 56 is slidable in cylinder 54. A plurality of clutch plates 58 are provided drivingly connected to input member 50. The clutch housing 52 has internal splines 60 formed thereon drivingly engaged with clutch plates 62 which are interleaved with clutch plate 58 on input member 50. Thus it will be seen that when fluid pressure moves piston 56, clutch plates 58 and 62 will be pressed together to form a driving connection between input member 50 and clutch housing 52.

Planetary gear set 12 is a composite gear set involving two simple planetary gear sets and includes a pair of sun gears 70 and 72 which are formed integral with intermediate shaft 34 but which could be formed separately and drivingly connected to shaft 34. A carrier member 74 is provided having planetary pinion gears 76 rotatably mounted thereon. Carrier member 74 is connected to clutch housing 52 to be driven thereby when clutch 20 is activated. Planetary pinion gear 76 meshes with a ring gear member 78 and with sun gear 72. A second planetary carrier member 80 is provided carrying a plurality of planetary pinion gears 82. The planetary pinion gears 82 are meshed with a ring gear 84 and with sun gear 70. Planetary carrier 80 is connected and integral with an output member 90 which takes the form of a short hollow shaft. Although the output member 90 is shown integral with carrier 80, it could be made separately and secured thereto with splines and/or welding as is known in the art. The output gear 16 is integral with output member 90. The planetary gear set 12 by application of the various clutch and brake members provides a plurality of forward drive ratios and a reverse ratio as will be later described.

Brake member 22 includes a drum member 100 having a drum 102 formed thereon and a friction brake band 104 fixed to the housing for the transmission, is provided which is adapted to be contracted by fluid pressure to hold the drum 102 stationary. Brake 24 includes a smooth drum 110 formed integral with ring gear 84 and a brake band 112 affixed to the housing of the transmission which may be contracted by fluid pressure to hold ring gear 84 stationary. Brake member 26 includes a drum 120 formed on the external portion of clutch member 52 and a friction brake band 122 fixed to the transmission housing and which may be contracted by fluid pressure to hold clutch member 52 stationary.

As will be apparent, sun gears 70 and 72, and carrier member 74 comprise input elements to planetary gear set 12; ring gear 84 is a reaction element for gear set 12; carrier 74 and sun gears 70 and 72 may also act as reaction elements for the gear set 12; and carrier 80 is the output element for gear set 12.

As mentioned above, the transmission mechanism 10 is similar to that disclosed in U.S. Pat. No. 3,802,294 and is adapted to provide four forward driving ratios and a reverse driving ratio in a manner similar to that described in the mentioned patent. The first or low ratio is provided by engagement of clutch 18 and brake 24. Clutch 18 connects the input shaft 30 to sun gears 70 and 72, and with ring gear 84 being held stationary by brake band 112, the output gear 16 will be rotated in a forward direction at a reduced ratio.

Second ratio is obtained by holding brake 24 engaged while releasing clutch 18 and engaging clutch 20. The planet carrier 74 will then be driven by shaft 32, causing the sun gears 70 and 72 to rotate at a speed higher than input speed and carrier 80 will be driven in a forward direction at a higher speed than in first ratio.

Third ratio or direct drive is obtained by releasing brake 24, keeping clutch 20 engaged, and engaging clutch 18. Since clutches 18 and 20 are both engaged, carrier 74 and sun gears 70 and 72 will be driven by the input shaft 30 at the same speed thus locking up planetary gear set 12 and driving output gear 16 in a forward direction at a one to one ratio.

Fourth or overdrive ratio, in a preferred form of the invention, is obtained by releasing clutch 18, holding clutch 20 engaged, and engaging brake 22. With brake 22 engaged the sun gears 70 and 72 will be held stationary and with the driving input through clutch 20 to carrier 74, carrier 80 will be driven in a forward direction at a higher speed or overdrive ratio.

Reverse drive ratio is obtained by engaging brake 26 to hold carrier 74 stationary and engaging clutch 18 whereby ring gear 78 and thereby carrier 80 and output gear 16 will be driven in the reverse direction.

The following is a table illustrating the ratios obtained by transmission 10 in an embodiment in which the ring gears 78 and 84 have twice the numbers of teeth as their sun gears 70 and 72 to provide four forward speed ratios and reverse with the fourth ratio being overdrive. This ratio coverage is particularly suitable for vehicles having low power to weight ratio, such as small passenger cars with 1 to 1.35 liter engines.

Ratio Table I

| Speed | Elements Engaged | Ratio Obtained |
|---|---|---|
| 1st | 18 – 24 | 3.0:1 |
| 2nd | 20 – 24 | 1.67:1 |
| 3rd | 20 – 18 | 1.0:1 |
| 4th | 20 – 22 | .67:1 |
| Reverse | 18 – 26 | 2.0:1 |

For vehicles having greater power to weight ratio, the gear ratios may be reduced by selecting other tooth combinations. For example, if the sun gears 70 and 72 are given 36 and 31 teeth and their corresponding ring gears 84 and 78 respectively, are given 66 and 65 teeth, the following ratios, suitable for 1.5 to 2 liter engines, are obtained:

Ratio Table II

| Speed | Elements Engaged | Ratio Obtained |
|---|---|---|
| 1st | 18 – 24 | 2.83:1 |
| 2nd | 20 – 24 | 1.59:1 |
| 3rd | 20 – 18 | 1.0:1 |
| 4th | 20 – 22 | .68:1 |
| Reverse | 18 – 26 | 2.10:1 |

From the above it will be apparent that the present invention, as described, provides an improved form of transmission mechanism of the friction-start type. Of course, the above transmission requires a control mechanism preferrably of the hydraulic type to engage and disengage the various friction elements of the transmission which are not a part of the present disclosure. The above described transmission provides an extremely compact structure for obtaining four forward drive ratios and a reverse by providing the main input clutch and the secondary input clutch on opposite ends of the transmission when combined with a center output gear arrangement. Many advantages are obtained with the described arrangement, including for example, the fact that the isolated main input clutch 18 is easier to cool since the entire lubricating oil flow will go through the primary clutch and in addition the area of the clutch face may be increased as compared to transmissions having combined input clutches as shown in the above mentioned patent. Also, the isolated primary clutch 18 allows use of the flywheel 38 as a friction surface, this improves cooling since the flywheel has a relatively large mass and acts as a heat sink. In addition, it is believed that as compared to the structure of the above-mentioned patent the transmission described above will be somewhat shorter in axial length, while at the same time providing the above advantages.

The various features of the invention have been particularly shown and described, however, it should be obvious to one skilled in the art that modifications may be made therein without departing from the scope of the invention.

I claim:

1. In a transmission mechanism; an input shaft; an output gear; a planetary gear set having a pair of input sun gear elements, an input carrier element, an output carrier element connected to said output gear, and a pair of ring gear elements; said carrier elements having pinion gears each meshing with one of said ring and sun gear elements; two of said elements comprising reaction elements for said gear set; first and second clutch mechanisms; said clutch mechanisms each having portions connected to said input shaft; said first clutch mechanism connected to said sun gears and engageable to connect said input shaft to said sun gears; said second clutch mechanism connected to said input carrier element and engageable to connect said input shaft to the said input carrier element; said output gear being located between said first clutch and said planetary gear set; said second clutch located adjacent said planetary gear set on the opposite side thereof from said output gear; one of said ring gear elements being connected to said output carrier element; a brake mechanism for said input carrier element; a brake mechanism for the other of said ring gear elements and a brake mechanism for said sun gears, whereby through selective engagement of pairs of said clutch mechanisms and pairs of said clutch and brake mechanisms, except said first clutch and sun gear brake mechanism pair and said second clutch and input carrier brake mechanism pair, a plurality of drive ratios are available through said gear set.

2. A transmission mechanism as claimed in claim 1 wherein said reaction elements comprise said input sun gear elements and said input carrier element and including an intermediate shaft extending through said transmission and connecting said input shaft to said second clutch mechanism.

* * * * *